Apr. 17, 1923.

C. C. HANSEN

AUTOMATIC LIQUID VALVE

Filed Nov. 9, 1920

1,452,155

INVENTOR
Charles C. Hansen
BY
Herbert G. Ogden
his ATTORNEY

Patented Apr. 17, 1923.

1,452,155

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

AUTOMATIC LIQUID VALVE.

Application filed November 9, 1920. Serial No. 422,838.

*To all whom it may concern:*

Be it known that I, CHARLES C. HANSEN, a citizen of the United States, and a resident of Easton, county of Northampton, State of Pennsylvania, have invented certain new and useful Improvements in Automatic Liquid Valves, of which the following is a specification.

This invention relates to automatic liquid valves, but more particularly to a valve of that type separately passing both a gas or vapor and a liquid, as for instance water under pressure and adapted to automatically shut off the flow of gas, as for instance air with a given drop in the water pressure.

Such a type of valve is particularly advantageous in connection with machines operated by fluid under pressure and simultaneously utilizing a liquid for some other purpose or purposes. In case the liquid pressure drops below a given amount, in some classes of work, it is desirable that the air supply to the machine shall be automatically shut off. Other uses for such an automatic water valve will readily occur to those skilled in the art but I have simply mentioned one general class of use for which the valve is adapted.

The valve may conveniently be formed as a unitary structure or fitting adapted to be connected to air and water lines for instance at any given point in their length, and the valve need not be made a part of the machine itself, and may be constructed in various ways and yet carry out the principle of my invention.

To these ends the invention consists of the device illustrated in one of its preferred forms in the accompanying drawings, in which—

Figure 2:
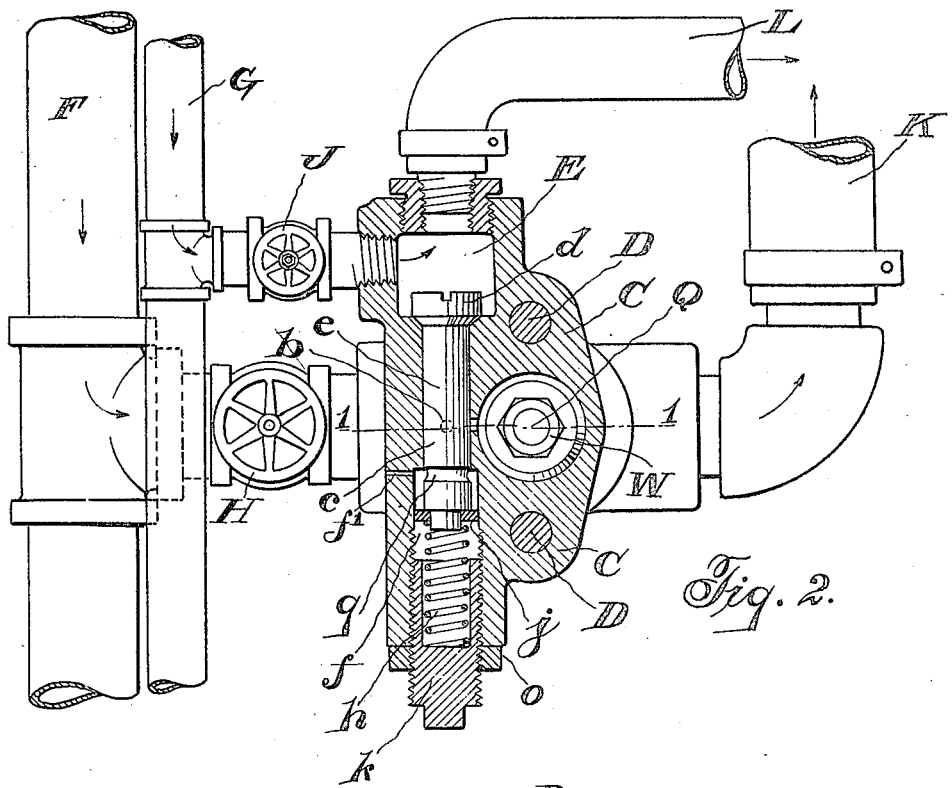
Figure 1:
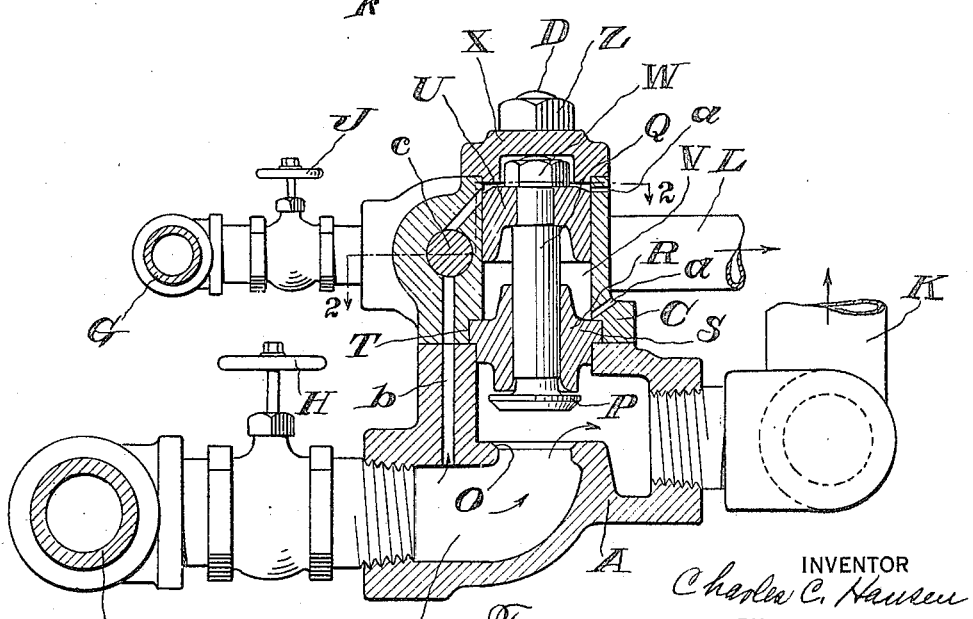

Figure 1 is a vertical sectional view of a valve structure on the line 1—1 of Figure 2, and Figure 2 is a horizontal sectional plan view on the line 2—2 of Figure 1.

Referring to the drawings, which illustrate one suitable construction, the valve may comprise a unitary casing in the form of a fitting, formed in one or more parts as desired but in this instance comprising the member A having the air passage B and the member C connected thereto as by means of the bolts D and nuts Z and having the water passage E. The main air line F and the liquid water line G to both of which a device is adapted to be connected, may extend as usual in any direction, and suitable controlling valves H and J control the connections between the automatic valve and the air and water lines respectively. The air pipe line K and the water line L lead from the automatic valve to the machine utilizing the air and water at the point of work.

I have shown the valve as a combined air and water valve but obviously any two fluids, one a liquid and one a gas or vapor may be utilized and I am not to be understood as limiting the invention to air and water. In the present embodiment of the invention, the valve controls the flow of air, the water flowing freely without check.

The casing member A as shown, is provided with a valve seat O upon which an air valve P is adapted to seat for shutting off the air supply. The air valve P in the construction shown is preferably of the poppet type and is provided with a spindle Q slidable in the guide R having the flange S held in the under-cut portion T of the casing member C. The outer end of the spindle Q is provided with a plunger head or piston U movable in the chamber V and of larger diameter than the valve head P. The plunger head Q may be secured to the valve stem of the spindle as by means of the nut W and a suitable cap X is secured over the chamber V as by means of the bolts D and nuts Z before referred to. The space over the plunger head U may be vented to atmosphere as by means of the small vent $a$. The valve P is normally maintained open by the pressure of air passing through the passage B. and a vent $a'$ is provided under the end.

As a suitable and compact form of construction, a by-pass $b$ is formed in the casing members A and C leading directly from the air passage B to a point in the chamber V near the outer end of said chamber and this by-pass is adapted to be controlled by a cylindrical pilot valve $c$ having a head $d$ in the water passage E seating on the casing preferably on a ground surface and provided with a stem $e$ extending into a chamber $f$ and formed with a groove $g$. A spring $h$ is adapted to be compressed between a washer $j$ on the end of the valve stem $e$ and an adjustable cap $k$ closing the chamber $f$ and provided with a lock nut $o$. The chamber $f$ is preferably vented to atmosphere at $f'$. The water pressure in the water passage E tends to maintain the pilot valve in the position indicated in Figure 2 with the head *d* seating on the casing and the by-pass *b* closed and the spring *h* may be set to exert any given pressure so that if the water pressure falls below the amount for which the spring is set, the pilot valve will be forced longitudinally by means of the constantly acting spring in a direction to move the groove *g* opposite the by-pass *b* and admit air under pressure from the air passage B to the plunger head U of the air valve P, so that the air valve will automatically close and the air will be shut off. Such an automatic device will insure the cutting off of the air, in case the water pressure falls below a given amount. By this construction a great variation in pressure of the liquid has no effect on the valve because the head *d* is merely pressed tighter against its seat in the casing.

I claim:

1. An automatic valve passing both liquid and gas under pressure and adapted to shut off the flow of gas with a given drop in the pressure of the liquid, comprising a casing having separate passages for liquid and gas, a valve controlling the gas passage, a by-pass leading directly from the gas passage to the valve, a pilot valve controlling said by-pass, means on said pilot valve adapted to form a part of the by-pass, said pilot valve being subjected to the pressure of the liquid, and means for automatically opening the by-pass and causing the said gas valve to close when the pressure of the liquid drops to a predetermined amount.

2. An automatic valve separately passing both gas and liquid under pressure and adapted to shut off the flow of gas with a given drop in the pressure of the liquid, comprising a unitary casing having separate passages for the gas and liquid, a differential valve controlling the gas passage, a by-pass from said passage to the larger pressure area of said differential valve, a cylindrical pilot valve controlling said by-pass, and constantly subjected to the pressure of the liquid tending to maintain the pilot valve closed, an annular groove at one end of said pilot valve adapted to register with said by-pass to open communication therethrough, and a spring at one end of said pilot valve set for a given lower pressure tending to open said pilot valve, whereby upon drop in the pressure of the liquid sufficient to be overcome by the spring, the by-pass will be opened by the pilot valve and the differential gas valve closed to shut off the flow of gas.

3. An automatic valve for passing both a liquid and a gaseous medium under pressure and adapted to shut off the flow of one medium with a given drop in the pressure of the other, comprising a unitary casing having separate continuous passages within the casing for the flow of both mediums, a differential valve controlling the passage of one medium, the other medium being unrestricted in its flow through the casing, a by-pass leading directly from the valve controlled passage to the larger pressure area of the differential valve, a cylindrical pilot valve in said casing, adapted to interrupt the continuity of said by-pass when in one position and means on said pilot valve permitting communication through the by-pass when in another position, constantly acting means tending to maintain the pilot valve in position to close the by-pass, said pilot valve being constantly subjected to the pressure of the freely passing medium tending to overcome the pressure of said constantly acting means and move the pilot valve in the opposite direction to open the by-pass, whereby, the by-pass will be opened and closed by a variation in pressure of predetermined amount in the freely flowing medium and the differential valve moved permitting and checking the flow of the valve controlled medium.

4. An automatic valve for passing both a liquid and a gaseous medium both under pressure and adapted to shut off the flow of the gaseous medium with a given drop in the pressure of the liquid, comprising a unitary casing having separate continuous passages within the casing for the flow of both mediums, a differential valve controlling the gas passage, the liquid being unrestricted in its flow through the casing, a by-pass leading directly from the gas passage to the larger pressure area of the differential valve, a cylindrical pilot valve in said casing adapted to interrupt the continuity of said by-pass when in one position and means on said pilot valve permitting communication through the by-pass when in another position, constantly acting means tending to maintain the pilot valve in said first named position, said pilot valve being constantly subjected to the pressure of the liquid tending to overcome the pressure of said constantly acting means and move the pilot valve in the opposite direction, whereby the by-pass will be opened and closed by a drop in pressure of predetermined amount in the liquid and the differential valve moved permitting and checking the flow of the gas.

5. An automatic valve for passing both a liquid and a gaseous medium under pressure and adapted to shut off the flow of one medium with a given drop in the pressure of the other, comprising a unitary casing having separate continuous passages within the casing for the flow of both mediums, a differential valve controlling the passage of one medium the other medium being unrestricted in its flow through the casing, a by-pass leading directly from the valve controlled passage to the larger pressure area of the differential valve, a cylindrical pilot valve in said casing adapted to interrupt the continuity of said by-pass when in one position and an annular groove on said pilot valve forming a part of the by-pass and permitting communication through the by-pass when in another position, constantly acting means tending to maintain the pilot valve in one position, said pilot valve being constantly subjected to the pressure of the freely flowing medium tending to overcome the pressure of said constantly acting means and move the pilot valve in the opposite direction, whereby the by-pass will be opened and closed by a drop in pressure of predetermined amount in the freely flowing medium, and the differential valve moved permitting and checking the flow of the valve controlled medium.

In testimony whereof I have signed this specification.

CHARLES C. HANSEN.